Sept. 17, 1957  B. E. PATRICK  2,806,599
VACUUM CONTROL FOR GRAVITY SEPARATORS
Filed July 26, 1954
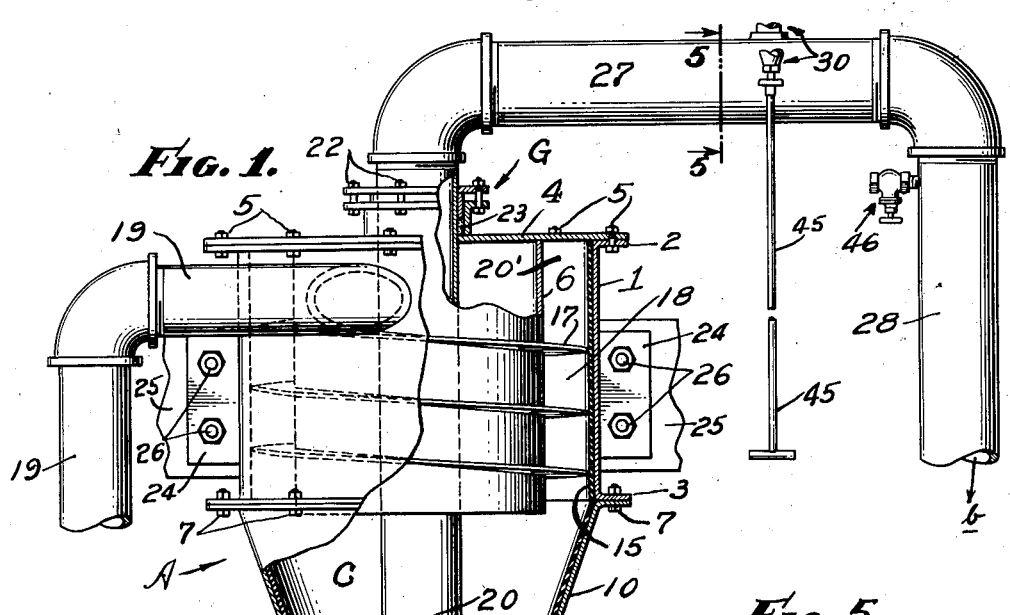
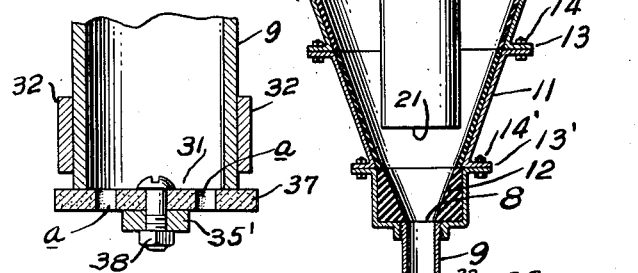
INVENTOR.
BENJAMIN E. PATRICK
BY
Lee J. Larrabee
his ATTORNEY.

United States Patent Office 2,806,599
Patented Sept. 17, 1957

2,806,599

VACUUM CONTROL FOR GRAVITY SEPARATORS

Benjamin E. Patrick, Compton, Calif., assignor to Irene Cottrell, Los Angeles, Calif.

Application July 26, 1954, Serial No. 445,616

9 Claims. (Cl. 209—211)

My invention relates to an apparatus for separating solids of different specific gravity and weight, from a directed current of such solids mixed or suspended in a fluid such as water.

The invention relates particularly to novel means for effectively recovering the extremely fine fractions of sand (say from the minus 100 mesh to minus 325 mesh) and/or precious metals or mineral ores from a suspending fluid, such as water, and such mixture of water and fines (either sand or precious metals or mineral ores) may be referred to as pulp or gangue, or suspensions of material.

Heretofore such fines have been recovered in separators of a liquid cyclone type in which the pulp has been pumped or forced tangentially into the separator, the centrifugal force created within the unit causing the fines to move to the outer perimeter of the depending cone where they work downwards and are discharged at the apex of the cone, and the slimes collected in the vortex of the swirling mass of pulp or gangue being removed by suction through the axis of the cyclone and through the top of the device.

However, in many instances, due to variations in the quantities of the solids pumped into the separator, as well as variations in the specific gravity of such solids, the pressure of the feed pump is varied causing an irregular vacuum in the discharge line to be developed, with a resultant irregular or bouncing motion occurring in the vortex of the pulp and which causes a "water hammer" in the lower conical section of the separator. Whenever the vortex of the pulp in the separator is upset, and a water hammer action sets in, the efficiency of the separator will drop, that is, values begin to come over in the discharge line and fluid tends to spew out of the underflow, and if not stopped within a few seconds, the fluid emitted from the underflow becomes uncontrollable and develops into a solid stream of pulp being discharged from the underflow, thereby decreasing the flow in the discharge line so that the vacuum is broken and the efficiency of the separator completely destroyed.

An object of my invention is to provide novel means whereby the vacuum created in a cyclone separator of the above type may be maintained so as to reduce to a minimum likelihood of a "water hammer" being created in the separator cone.

Another object of my invention is to provide a liquid cyclone type separator of the above character with novel means whereby the above referred to objectionable features heretofore encountered in its operation are eliminated.

A still further object of my invention is to provide a low pressure liquid cyclone type separator with novel means, whereby after initial adjustment will be fully automatic during operation of the separator from zero point to full capacity of feed.

The invention resides in the parts, and combination and arrangement of the parts, as more fully hereinafter described in detail in the accompanying specification and defined in the claims.

Other objects, advantages and features of invention may appear from the accompanying drawings, the subjoined detail description, and the appended claims.

The accompanying drawing illustrates the invention in a form I at present deem preferable.

Figure 1 is a side elevational view of a low pressure cyclone type separator equipped with the arrangement and parts of my invention. Parts are shown in axial section, and other parts are broken away to more clearly show interior construction, and to contract the view.

Fig. 2 is a vertical axial sectional view, on enlarged scale, of the flapper valve secured to the underflow line, a fragment of which is shown.

Fig. 3 is a transverse sectional view taken on line 3—3, Fig. 2. A part of the flapper valve weight arm is broken away to contract the view.

Fig. 4 is a vertical sectional view taken on line 4—4, Fig. 2.

Fig. 5 is a sectional view taken on line 5—5, Fig. 1, and showing the vacuum control valve connected to the outlet pipe.

The low pressure cyclone gravity separator A generally comprises an upper cylindrical section 1 provided with upper and lower outwardly extending flanges 2, 3. A centrally apertured top member or cover plate 4 is secured to upper flange 2 of cylinder 1 by bolts 5, or the like.

Depending from, and at its upper end welded to, the underside of cover plate 4 is a cylindrical wall or guide core 6 that is open at its bottom and spaced from cylinder 1 a predetermined distance and extends a slight distance below the lower flange 3.

A lower frusto-conical section B is secured at its base or upper end to lower flange 3 of cylinder 1 by bolts 7, or the like, and terminates at its apex in a restricted outlet 8 that communicates with an underflow line 9.

The lower section B is preferably made up of an upper conical section 10, an intermediate conical section 11, and a lower conical section 12. The intermediate section 11 being connected to the upper section 10 and to lower section 12 by any suitable means, such as the outwardly extending flanges 13, 13' and bolts 14, 14', or the like.

The inner surfaces of upper section 1 and lower section B are provided with a suitable replaceable rubber liner or protective covering 15, 16 respectively.

A fin 17 is welded to the outer face of guide core 6 and projects laterally therefrom into and across the space 18 and between said core 6 and the inner surface of the cylindrical section 1. The fin 17 is helically arranged around guide core 6 and in said space 18 to form a helical path or guide-way therein which empties into the conical chamber C of lower section B.

It will be noted that the fin 17 does not extend all the way to the top of the guide core 6 but terminates below the cover plate 4 a distance at least equal to the vertical separation of successive turns or loops of the helical guide-way 18, and to receive the material from the inlet or feed conduit 19 that extends tangentially from the upper cylinder 1 and empties tangentially into the upper end of helical guide-way 18. It will be seen that the material to be separated and which is forced into the cylinder 1 through inlet 19 can make (at least one) complete revolution about the guide core 6 in the upper annular passageway 20' of the helical guide-way 18 before descending such guide-way 18.

The cross-sectional area or capacity of the helical guide-way 18 is approximately the same as the inlet or feed conduit 19 so that there is no loss of energy or turbulence in the flow of the material into passageway 20' and through helical guide-way 18 which imparts to the suspension a rotary or whirling motion which continues when the suspension enters the conical chamber C, whereupon the lighter gravity or more finely divided solids tend to rise toward the top, and the heavier or coarser solids gravitate to the bottom.

The passageway 18 just before it discharges into chamber C is slightly constricted so as to insure that the passageway 18 will be filled with suspension and be ejected with a slight nozzle effect into chamber C which is like an "expansion chamber" where the volume of suspension is maintained by the restricted outlet 8.

The construction, arrangement and features that cause the flow of the suspensions through the device as above set forth are advantageous, first, in that the compact structure of the helical guide-way or chute insures that the inlet pressure does not fall off greatly (as might be the case if the guide core 6 was of smaller diameter, so that the cross area of the passageway 18 would be greater than the cross area of inlet pipe 19); and, second, that the entire suspension stream is positively rotated at substantially the same rate.

An upright outlet tubular member 20 preferably of a diameter slightly larger than the inlet pipe 19, extends axially through the aperture in the top member 4 and is in some operations positioned so that its mouth or inlet 21 is in close proximity to the restricted outlet 8.

The outlet member 20 is adjustable longitudinally and along the axis of the separator A, and is held in adjusted position by means of the packing gland G surrounding the central aperture in the top or cover plate 4. Tightening of the bolts 22 of the gland G will compress the packing 23 and bind or hold the outlet member 20 in any predetermined adjusted position. Accordingly the inlet or mouth 21 of outlet tube 20 can be raised or lowered through the cover plate 4 and conical section B to vary the distance between the mouth 21 and the restricted opening 8 to determine (for a given rate of flow) what fraction of the material will be separated.

Bracket arms 24 extend from the upper cylinder 1 to provide means for securing the separator A to a support 25 by the bolts 26.

The upright outlet member 20 is connected at its upper end to a horizontal outlet member 27 which in turn is connected to an open ended depending discharge member 28.

The foregoing low-pressure cyclone gravity separator is not my invention, as the same was invented by William P. Cottrell, deceased, and is covered by his application filed March 6, 1950, Serial No. 147,865, for a Gravity Separator, now issued as Patent No. 2,738,070, granted March 13, 1956.

My invention resides in combining with such apparatus an automatic control valve 29 to control the underflow of the separator A and the vacuum therein, and in the provision of a vacuum breaker valve 30 in the horizontal outlet member 27.

The control valve 29 may be termed a "flapper valve" that is secured to the lower end of the underflow line 9 and automatically controls the open end 31 thereof.

Valve 29 includes a split ring member or clamping collar 32 to be received on the pipe 9 which forms the underflow line. Ears or lugs 33 extend outwardly from each side of the split ring member 32, and are spaced apart to receive therebetween a lug or bearing member 34 of valve support arm 35. Bolt and nut means 36 extend through the lugs 33 and bearing member 34 and serve when tightened to clamp ring 32 securely onto pipe 9, and when so tightened the lugs will still be spaced apart a sufficient distance to permit the bearing member 34 to oscillate on bolt 36 which forms a shaft therefor.

The valve support arm 35 is in the form of a narrow strip and extends forwardly as at 35', from bearing lug member 34 substantially across the opening of line 9 and has a washer or sealing member 37 secured thereto by bolt and nut means 38. The member 37 is of greater diameter than pipe 9 and normally seats on the lower open end thereof in inoperative position of the separator A.

The seat member 37 is preferably provided on opposite sides of the forward extension 35' with bleeder holes a, the function of which will be hereinafter explained.

The support arm 35 has a weight arm 39 that extends rearwardly or outwardly and preferably downwardly from the bearing member 34, and is provided with an elongate slot 40 through which a bolt 41 passes to secure a weight 42 in predetermined adjusted position therealong by tightening nut 43.

I also provide that vacuum breaker valve 30 which is connected to the upper side or top of outlet member 27 is open to the atmosphere at 44. A rod 45 for opening or closing valve 30 is connected thereto and depends therefrom so as to be within reach of an attendant on the ground. Another vacuum breaker valve 46 may be positioned on the inside of depending discharge member 28 and adjacent the horizontal outlet member 27, so that in such position the flow of material will be deflected toward the side of the outlet pipe opposite the position of valve 46 and thereby will not escape to the atmosphere through the valve 46.

The location of the mouth or inlet 21 of tube 20 relative to the restricted outlet 8 determines (for a given rate of flow) what fraction of the suspended material will be separated, and in Fig. 1 I have shown the discharge tube 20 (because of confinements of the sheet of drawing) in its lowermost position for recovering extreme heavies from the material in suspension; and the tube 20 is adjusted upwardly or away from outlet 8 to recover the lighter materials. The tube 20 when raised to its uppermost position being in position to receive the light fines from the material.

Preferably the separator A is installed in an elevated position so that the depending discharge member 28 will be vertical and have a height of 18 feet or more, its discharge end or outlet b being open to the atmosphere and empties into an open trough or flume (not shown), and the discharge pipe 27, 28 should be installed with a minimum number of turns, and the discharge passage should be devoid of restrictions and free of valves.

The pulp to be fractionated may be admitted to the helical guide-way 18 in upper section 1 by gravity, or a low pressure pump (not shown), through inlet tube 19. Such pump having a pressure of from 14 to 40 lbs. p. s. i., and if used its inlet end should be immersed in a surge box, so that no air will be drawn into the inlet 19.

In operation, the separator A being installed as above, is first adjusted by passing the suspension fluid (devoid of solids to be separated therefrom) therethrough as such capacity is considered the minimum; (and with the clamping collar 32 mounted on underflow line 9 so that sealing member 37 of flapper valve 29 seats evenly on the end of pipe or line 9), the vacuum breaker valve 30 is opened so that the vacuum in the outlet or discharge tube 28 will be such as to "balance" the flapper valve sealing member 37 on the open end of the pipe 9 so that the same flutters slightly thereon. Adjustment of weight 42 on arm 39 also aids in obtaining and maintaining this balance.

The percentage of solids in the feed should be preferably between 10% and 15% and should not usually exceed 25%, and after a few trial runs the inlet of discharge pipe 20 may be positioned to the proper adjusted elevation to recover the desired solids or fractions of the material suspended in the fluid.

With pulp being admitted to the separator, it will be forced through the helical guide-way 18 at approximately the same pressure as that of the pump, and when it reaches the end of the spiral, it is released into the lower conical section B subject to a vacuum of from 0. to 4" mercury while a pressure of 18 lbs. is maintained in the spiral, and from which its speed or velocity is maintained or increased, due to a rapid decrease in circumference of the conical section B. Such vacuum is created by the overflow of the discharge line which, as stated, has a minimum vertical drop of 18 feet, the discharge line also being larger than the input or feed tube.

As the whirling pulp descends the cone section B, the solids are centrifugally forced against the walls of the conical chamber and along which it descends until it passes through the restricted outlet 8 and is deposited on the valve sealing member 37 until its weight counteracts the weight 42 whereupon the valve 29 will be automatically opened and permit the recovered fines to pass out of the underflow line 9.

The bleeder holes $a$ in seat member 37 provide for passage of air into the underflow line 9 so that the vacuum in chamber C will not hold the valve 29 in seated or closed position.

The size and number of bleeder holes $a$ is usually governed by the size of the cone and underflow line. If too large or too many holes $a$ are used, too much air will enter the underflow line, and the vortex in the chamber B will set up an irregular or bouncing motion, and thereby break the vacuum in the discharge line 20, 27 and 28, and result in a full stream of pulp to be discharged from the underflow line 9, as well as to allow values to be lost through discharge therefrom through the discharge line, and it is such irregular or bouncing motion that my invention eliminates.

If too few or too small bleeder holes $a$ are used, the vortex will be impaired and the underflow line will be clogged with a solid mass of fines, the moisture from which will be withdrawn by action of air entering holes $a$ and passing through the fines accumulated in pipe 9.

It has been found that if the fines to be recovered are light in weight or size that more air is required to be admitted to the discharge line through the vacuum breaker valve 30; and in some instances, it may be necessary to open the vacuum breaker valve 46 to provide additional vacuum breakage in the discharge line, this is particularly so as the specific gravity of the fines to be recovered is lighter.

The vacuum in the discharge line may be broken or adjusted by admitting air thereto in controlled quantities through either valve 30 or valve 46, or through both at the same time, and such vacuum is adjusted so as to be in balance with the weight of the fines recovered. In other words, a balance is obtained between the weight of the fines on the flapper valve 29 and the amount of vacuum pull in the discharge line to remove the sludges.

While the suspending fluid will in most cases for practical reasons be water, since this is generally the cheapest and most available liquid to add to aggregates, other liquids could similarly be used. Likewise, there are many examples of separating solids wherein the solids are not obtained in a dry form to which a liquid is added, but are obtained already admixed as in the case of mud, marine or placer deposits, latex, milk and chemical reaction products which are formed in a liquid medium.

In addition, air or other gas may form the suspending fluid—either originally or by addition—for fractionating or separating light aggregates. Thus the apparatus can be used, for example, to remove solid particles from currents of dust, lint, soot, slag fumes, and finely divided mineral material (cement, pearlite, asbestos, etc.).

The separator is particularly adaptable for separating mineral ore (e. g., lead, iron, tungsten) from the gangue even when the two are ground to the same fineness, as long as they differ in density. For example, it can separate mica and graphite of the same mesh; also coal from shale; the mica or coal go through the fractionating tube, the other out of the bottom or underflow line. Or with material of the same density, such as sand and gravel, the material can be divided into portions of different size or fineness.

Generally, the separators are fabricated with about 6 to 25 inch internal upper diameter although this is not critical.

Although I have shown and described an underflow control valve 29 of a particular type, nevertheless substantially the same operational result may be obtained by omitting the bleeder holes $a$, and serrating the lower end of pipe 9 and through which serrations air could flow and enter the pipe 9.

The invention in its broader aspects is not limited to the specific mechanisms shown and described, but departures may be made therefrom within the scope of the accompanying claims without departing from the principles of the invention and without sacrificing its chief advantages.

I claim:
1. In a separator for suspensions, the combination of an upper section having a top member, and a frusto-conical section depending from said upper section and having its base open to said upper section and being provided with a restricted outlet at its apex; means to introduce suspensions from said upper section into said frusto-conical section in a circumferentially rotary motion; an upright tubular outlet member extending axially through said top member and having its mouth opening in said frusto-conical section, and its discharge end extending vertically downward to a point below said separator apparatus whereby a vacuum pull is created in said outlet member; valve means to close said restricted outlet and having a sealing member upon which recovered values may be deposited to move said valve means to open position; and means to admit a predetermined quantity of air to said outlet member whereby the weight of the recovered values on said sealing member may be balanced with the vacuum pull in said outlet member.

2. In a separator for suspensions, the combination of a suspension receiving chamber, means admitting pulp under pressure into said chamber; means in said chamber to impart a circumferentially rotary motion to said pulp, a frusto-conical suspension separating chamber having its base in open communication with said receiving chamber and provided with a restricted outlet at its apex; an underflow line connected to said restricted outlet; an open ended outlet member having its mouth positioned in said separating chamber and extended to a point outside of and below said separator to withdraw sludges of said pulp from said separating chamber under vacuum; valve means to close the discharge end of said underflow line and to control the passage of recovered fines therefrom; means to prevent the vacuum in said separating chamber from holding said valve in closed position; and vacuum breaker means associated with said outlet member to vary and control the vacuum in said outlet member, and to obtain a balance between the weight of the fines recovered and the vacuum pull in said outlet member.

3. In a separator for suspensions, the combination of a suspension receiving chamber, means admitting pulp under pressure into said chamber; means in said chamber to impart a circumferentially rotary motion to said pulp whereby an axially disposed vortex is created in said whirling pulp and a vacuum created in said separating chamber; a frusto-conical suspension separating chamber having its base in open communication with said receiving chamber and provided with a restricted outlet at its apex; an underflow line connected to said restricted outlet; an open ended outlet member having its mouth positioned in the vortex of the pulp in said separating chamber and extended to a point outside of and below said separator to withdraw sludges of said pulp from said separating chamber under vacuum; valve means to close the discharge end of said underflow line and to control the passage of recovered fines therefrom; means to prevent the vacuum in said separating chamber from holding said valve in closed position; and vacuum breaker means associated with said outlet member to vary and control the vacuum in said outlet member and in said separating chamber, and to obtain a balance between the weight of the fines recovered and the vacuum pull in said outlet member.

4. A separator as defined by claim 2, wherein the underflow line valve means includes a member secured to said underflow line, a valve support arm pivotally connected intermediate its ends to said member and having at one end a sealing member coacting with the discharge end of said underflow line, said sealing member being provided with bleeder holes open to the atmosphere and to said underflow line; and weight means on the other end of said valve support arm.

5. A separator as defined by claim 2, wherein the underflow line valve means is normally in closed position, and automatically moved to open position by the weight of the fractions recovered from the pulp introduced into said separating chamber.

6. A separator as defined by claim 2, wherein the underflow line valve means is normally in closed position, and automatically moved to open position by the weight of the fractions recovered from the pulp introduced into said separating chamber, and in which said underflow line valve means is so constructed and arranged to permit atmospheric air to enter the separating chamber through said underflow line.

7. A separator as defined by claim 2, wherein the vacuum breaker means is positioned on the upper side of the open ended outlet member; and in which the underflow line valve means is so constructed and arranged to admit atmospheric air into said underflow line.

8. A separator as defined by claim 2, wherein the open ended outlet member includes a vertical portion extending axially through said vortex, a substantially horizontal portion connected to a depending vertical discharge portion; and wherein the vacuum breaker means are connected to the upper side of said horizontal portion.

9. A separator as defined by claim 2, wherein the open ended outlet member includes a vertical portion extending axially through said vortex, a substantially horizontal portion connected to a depending vertical discharge portion; and wherein the vacuum breaker means are connected to the upper side of said horizontal portion, and an additional vacuum breaker means are connected to the depending vertical discharge portion of said outlet member adjacent the horizontal portion and opposite the normal line of flow of sludges therein.

References Cited in the file of this patent

UNITED STATES PATENTS

| 1,530,592 | Bradley | Mar. 24, 1925 |
| 1,890,206 | Andrews | Dec. 6, 1932 |
| 2,706,045 | Large | Apr. 12, 1955 |
| 2,738,070 | Cottrell | Mar. 13, 1956 |